Jan. 19, 1932.    B. V. E. NORDBERG    1,841,449
SAFETY HOIST BRAKE
Filed May 25, 1929    2 Sheets-Sheet 1

Inventor
Bruno V. E. Nordberg
By Dodge and ~~
Attorneys

Patented Jan. 19, 1932

1,841,449

UNITED STATES PATENT OFFICE

BRUNO V. E. NORDBERG, OF MILWAUKEE, WISCONSIN, ASSIGNOR TO NORDBERG MANUFACTURING COMPANY, OF MILWAUKEE, WISCONSIN, A CORPORATION OF WISCONSIN

SAFETY HOIST BRAKE

Application filed May 25, 1929. Serial No. 366,058.

Figure 1:
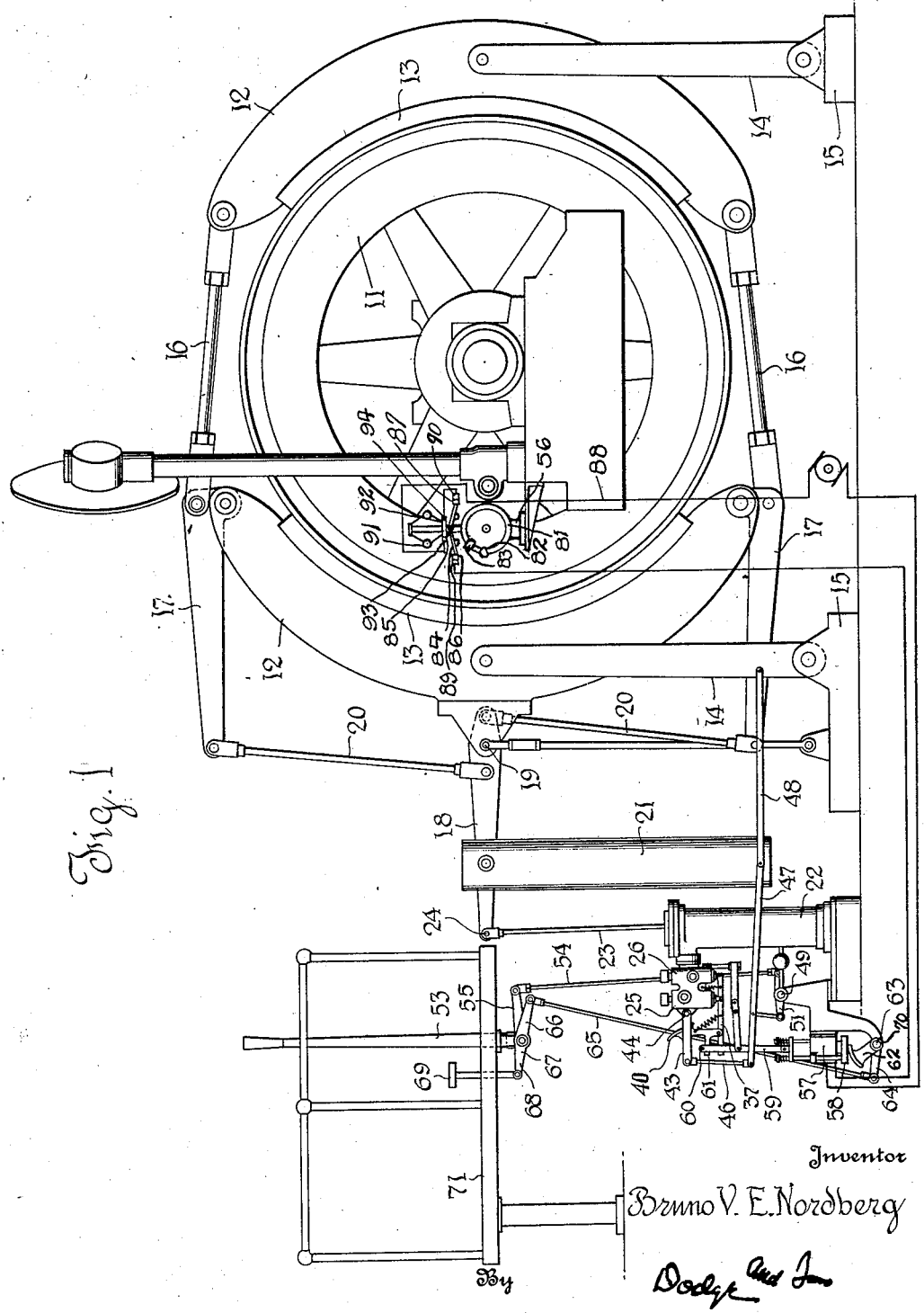
Figure 2:
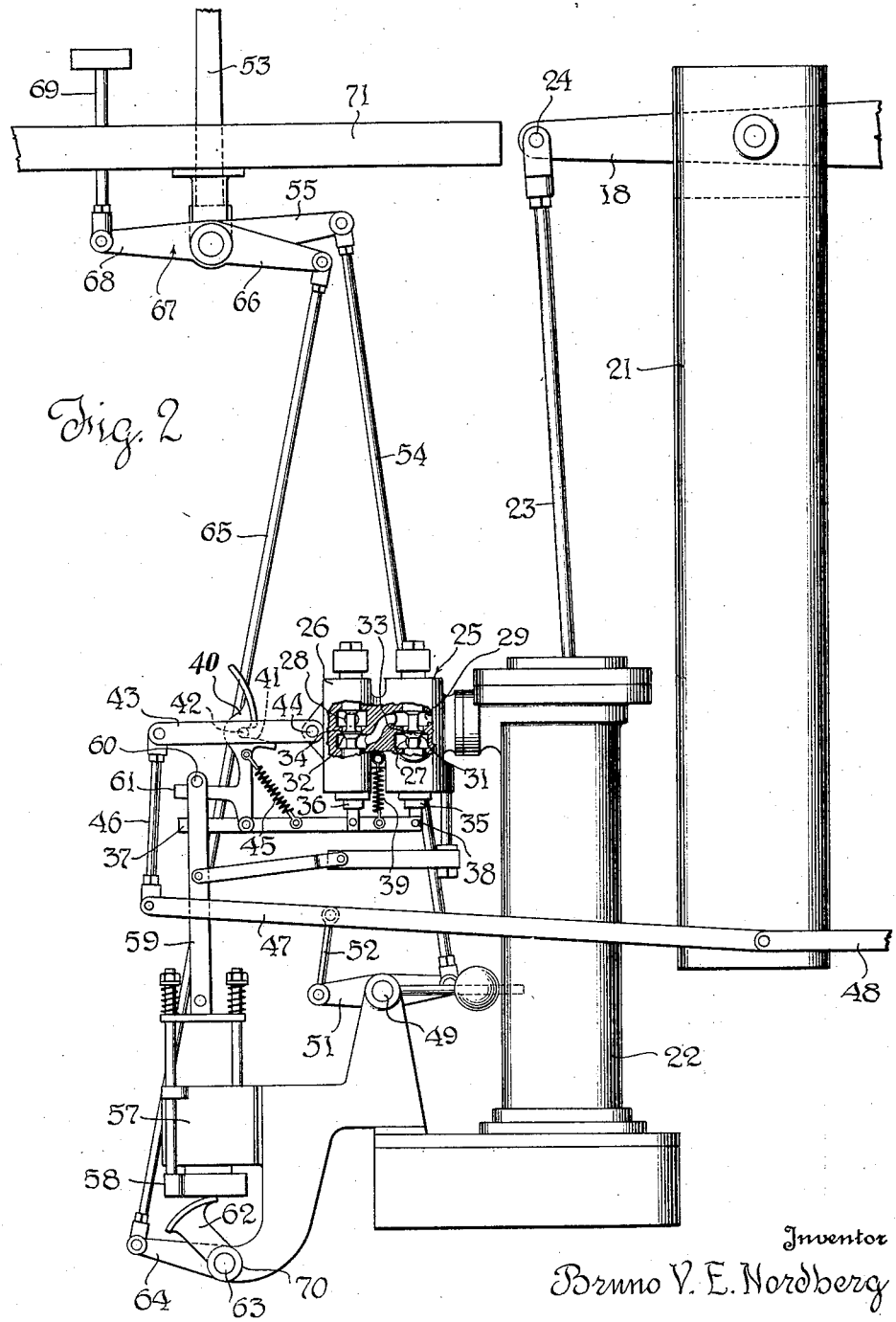

The present invention relates to power brakes for elevators and mine hoists and more particularly to mechanism for controlling the brake under abnormal or emergency conditions. Brake operators for hoists of the type referred to above are usually provided with automatic mechanism for applying the brakes under certain conditions such as overtravel of the cage, high speeds, and failure of the power lines. Automatic brake application may occur at a time when the cage is between levels and, particularly in case of fire, it is often desirable to release the brakes to permit further descent or elevation to bring the cage to a level at which the occupants can leave the cage. The present invention has for one of its objects the provision of a mechanism for releasing the automatic brake operator and returning the brakes to normal control. It is another object of the invention so to arrange the automatic operator that, so long as abnormal conditions exist, it again applies the brakes immediately upon release of the manual control. Further objects will be apparent from the following description of a preferred embodiment of the invention and the accompanying drawings in which:

Fig. 1 is a side elevation of the brake and mechanism for applying the brake; and Fig. 2 is an enlarged fragmentary view of a portion of Fig. 1.

The brake applying mechanism illustrated in the drawings is a well known form in which a drum 11, on which the cable supporting the cage is wound, has a peripheral braking surface with which the shoes 12, having facings 13, are adapted to coact for the purpose of preventing rotation of the drum. The shoes 12 are supported by links 14 fixed to base members 15 and are connected by adjustable links 16. Bell cranks 17 are connected to the shoes 12 and links 16 in the usual manner so that when the bell cranks are drawn toward each other the shoes engage the drum. A lever 18 is fulcrumed at 19 to one of the brake shoes and links 20 connect the bell crank levers 17 with the lever 18. Supported on the lever 18 at some distance from its fulcrum 19 is a weight 21 normally held in an elevated position by a piston in cylinder 22, a connecting rod 23 connecting the piston with the end of lever 18 at 24. It will be noted that the long arms of bell cranks 17 and the position of the weight 21 on lever 18 provide for relatively great leverage, resulting in a heavy braking pressure on the drum when the weight 21 descends.

The mechanism for manually controlling the position of the brake shoes includes a double valve 25 designed to control the flow of fluid to and from cylinder 22, thus raising or lowering the piston and weight 21. The valve 25 comprises a housing 26 having a port 27 in communication with fluid under pressure and a discharge port 28. In the present instance the fluid employed is oil, an accumulator providing the source of pressure to which port 27 is connected while port 28 leads to a sump for the discharged oil. It will be seen from the drawings that passage 29 communicating with cylinder 22 may be connected with either of the ports 27, 28, or, as shown, cut off from both ports.

The means for opening the ports 27, 28 comprises the poppet valves 31, 32, cooperating with seats 33, 34, the valve heads being formed on plungers 35, 36. Each of the plungers 35, 36 is pivoted to a lever 37 but to permit necessary relative movement between the lever and plunger 35, a pin and slot connection 38 is provided. Spring 39 is connected to the valve housing 25 and to lever 37 midway between plungers 35 and 36 normally to hold both valves against their seats, in which position the passage 29 is cut off from ports 27, 28. When the lever 37 is moved upwardly it will be seen that the connection with plunger 36 acts as a fulcrum and lowers plunger 35, thus moving valve 31 from its seat and establishing communication between port 27 and cylinder 22. Upward movement of the lever 37 therefore admits fluid under pressure to cylinder 22, raising the piston as well as lever 18 and weight 21 to release the brake. To apply the brake the lever 37 is lowered, at which time the pin and slot connection 38 is relatively fixed and plunger 36 is moved downwardly to open port 28 to the passage 29 and cylinder 22. This permits the oil in cylinder 22 to flow to the sump, the weight 21 then descending and drawing the brake shoes into engagement with the drum.

Pivotally secured to the lever 37 is a latch member 40 provided with a slot 41 adapted to engage pin 42 on lever 43, the latter being pivoted at 44 to the valve housing 26. The latch is normally urged into engagement with pin 42 by a spring 45 one end of which is attached to lever 37 while the other end thereof is secured to the latch member. Lever 43 is connected through link 46 with one end of a floating lever 47, the other end of which is connected to weight 21. Guide link 48 is connected at its ends with the weight and one of the links 14 respectively. Fulcrumed in bearing 49 is a lever 51 one end of which is connected by means of a link 52 with floating lever 47, the other end of the lever being connected to the hand operated lever 53 through link 54 and arm 55. It will thus be seen that movement of the lever 53 to the right will raise lever 37 through link 46, lever 43 and latch member 40, opening valve 31 and permitting oil under pressure to flow into cylinder 22 so as to raise weight 21. In this position of the lever the brake is released. By moving lever 53 to the left lever 37 is lowered, valve 32 opened and oil discharged from the cylinder to apply the brake.

After the hand lever 53 has been moved either to release or apply the brake and maintained in a desired position, the link 52 is relatively stationary and acts as a fulcrum for floating lever 47. If the weight 21 is being lowered, for instance, so long as link 52 is stationary the link 46 and levers 43 and 37 will be raised. This will return the valves 31 and 32 to closed or lapped position whereupon further downward movement of the weight 21 will cease. The converse is true during elevation of the weight, the valves 31 and 32 always tending to return to lapped position during movement of the weight.

The automatic means for applying the brake are responsive either to a device 56 which responds to overspeed, overwinding, etc., and which may be of any of the well known types employed for this purpose, or to a solenoid controlled mechanism which depends on the existence of electric energy in the system. One form of governor 56 is shown in Fig. 1, in which a disc 81 is provided with cams 82, 83, corresponding respectively with the upper and lower limits of cage travel. The disc makes one complete revolution when the cage travels either from its uppermost to its lowermost level, or vice versa, and the cams cooperate with switch arm 84, pivoted at 85, to rock the arm. At the ends of arm 84 are contacts 86, 87, adapted to close the circuit 88 of solenoid 57 through other contacts 89, 90. It is apparent that the circuit will be broken when either of the cams 82, 83, rocks switch arm 84, thereby deenergizing solenoid 57. The circuit 88 may also be broken by a speed responsive mechanism comprising a fly-ball governor 91 having a ring 92 bridging contacts 93, 94. At a predetermined speed of the cage, ring 92 is elevated to clear contacts 93, 94, thereby to break the solenoid circuit. The solenoid is also deenergized if, for any reason, the wires thereof are broken or disrupted. The brake is applied when, under any of the conditions referred to, the circuit is broken, resulting in deenergization of the solenoid 57, the armature of which is attached to a weight 58 and cooperates with rod 59. The latch member 40 described above is further provided with an arm or tail 61 extending at right angles thereto. Rod 59 is provided at its upper end with a pin 60 adapted to engage the tail 61. So long as the power system is supplied with current the solenoid will be energized and weight 58 maintained in an elevated position without interfering with the normal manual operation of the control valves. Should the power be cut off for any reason, such as fire, broken lines, etc., the solenoid will be deenergized, whereupon the weight 58 will drop, depressing the tail 61 and releasing latch member 40. The rod 59 not only depresses the tail 61 but lowers lever 37 so that the outlet valve 32 will be opened to discharge oil from cylinder 22. In this manner, upon deenergization of the solenoid, the weight 21 is permitted to fall and the brake is instantly applied. It is to be noted that, since the latch 40 is disengaged from lever 43, the floating lever 47 has no connection with lever 37 and will not return the valves to lapped position. The brake will therefore remain in applied relation to the hoist drum so long as the weight 58 is in its lowest position.

As stated above, deenergization of the solenoid may occur at a time when the cage is between two levels, in which case it is apparent that the occupants of the cage will be in extreme danger should fire, smoke or gas enter the hoist shaft. Under such circumstances it is desirable that the hoist operator regain manual control of the brake mechanism. Means for lifting weight 58 and reengaging the latch device are therefore provided. These means comprise a cam member 62 secured to a stub shaft 63 mounted in a bearing 70. Also secured to shaft 63 is an arm 64 connected by means of a link 65 with one arm 66 of lever 67. The other arm 68 of lever 67 is pivotally connected to a foot treadle 69 positioned adjacent lever 53 on the operator's platform 71. When it is desired to regain manual control of the valve operating mechanism controlling movement of weight 21, the treadle 69 is depressed whereupon the cam 62 will swing upwardly and elevate the weight 58. The connecting rod 59 is likewise raised releasing tail 61 and lever 37. Spring 45 will urge latch member into engagement with pin 42 on lever 43 and when the rod 59 has been raised a sufficient amount latch 40 will again engage pin 42. It will therefore be seen that by depressing treadle 69 and maintaining weight 58 in an elevated position it is possible to manipulate lever 53 and manually operate the power brake. Immediately upon release of the treadle, however, it is apparent that weight 58 will drop and disengage the valve operating levers associated with the manually controlled lever 53.

While the particular arrangement described above is a preferred form of the invention it is obvious that the details may be modified as desired and the mechanism applied to other types of brakes.

What is claimed is:

1. The combination of a rotary drum; braking means therefor; a manual control for said braking means; automatic means responsive to abnormal conditions for applying said braking means; means actuated by said automatic means for placing said manul control in inoperative relation to said braking means; and means for returning said manual control to operative relation with said braking means while said abnormal conditions exist.

2. The combination of a rotary drum; power braking means therefor; a manual control for said braking means; automatic means responsive to abnormal conditions for applying said braking means; said automatic means being adapted to disconnect said braking means from said manual control under said abnormal conditions; and manually operable means for restoring said automatic means to normal position to permit manual control of said braking means while said abnormal conditions exist.

3. The combination of a rotary drum; power braking means therefor; a manual control for said braking means; automatic means responsive to abnormal conditions for applying said braking means; said automatic means being adapted to disconnect said braking means from said manual control under said abnormal conditions; and manually operable means for reestablishing the connection between said manual control and said braking means to permit manual control of the braking means; said automatic means being adapted to break said connection upon release of said manually operable means so long as said abnormal conditions exist.

4. The combination of a rotary drum; braking means therefor; means for applying said braking means; a manual control for said applying means; a releasable connection between said control and said applying means; automatic means responsive to abnormal conditions for releasing said connection; said applying means being operable to brake said drum upon release of said connection; manually operable means for resetting the connection to permit release of the braking means; said applying means being returned to braking position upon release of said manually operable means.

5. The combination of a rotary drum; brake applying means therefor; fluid operated means for actuating said applying means; a manual control for said fluid operated means; a releasable connection between said fluid operated means and said control; electrically operated means adapted when energized to permit the fluid operated means to be connected to said control and when deenergized to release said connection; and manually operated means for restoring said connection while said electrically operated means is deenergized.

In testimony whereof I have signed my name to this specification.

BRUNO V. E. NORDBERG.